April 14, 1964     S. KITROSSER     3,128,685
CAMERA
Filed June 26, 1962      2 Sheets-Sheet 1
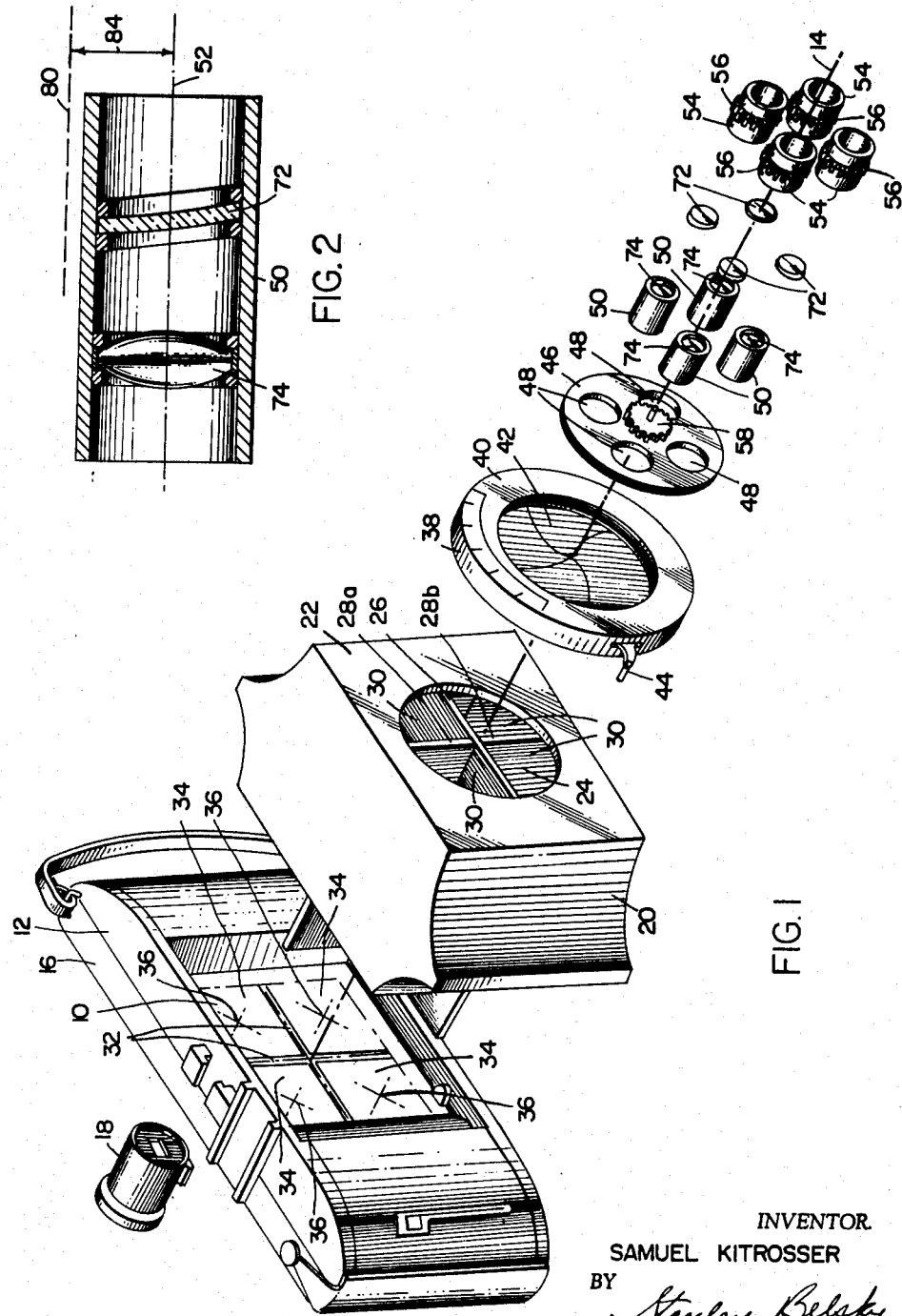
INVENTOR.
SAMUEL KITROSSER
BY
*Stanley Belsky*
ATTORNEY

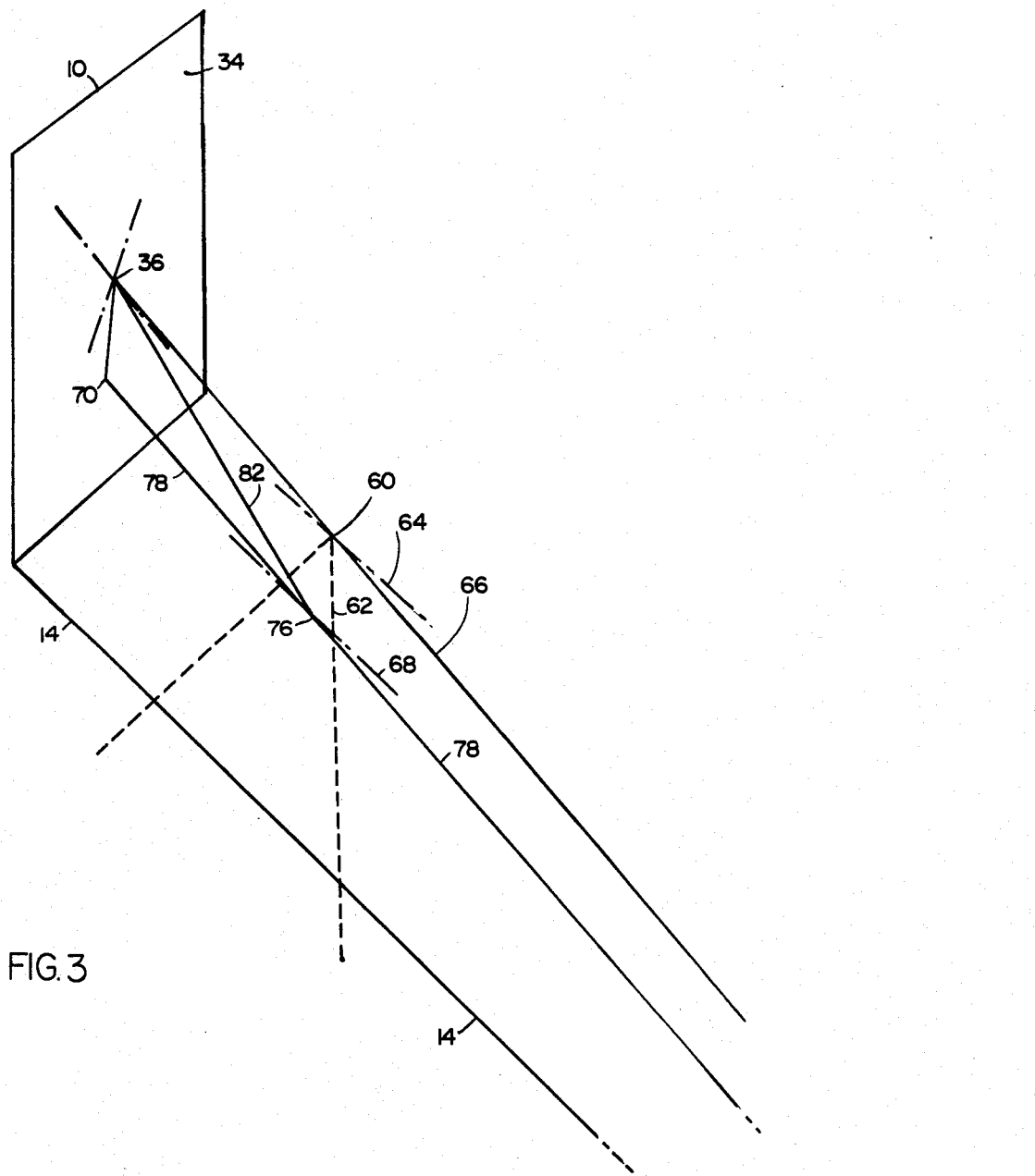

United States Patent Office 3,128,685
Patented Apr. 14, 1964

3,128,685
CAMERA
Samuel Kitrosser, Lexington, Mass., assignor, by mesne assignments, to Avant Incorporated, Lincoln, Mass., a corporation of Massachusetts
Filed June 26, 1962, Ser. No. 205,433
11 Claims. (Cl. 95—18)

This invention is concerned with a diffusion transfer process camera. In particular the invention is directed to a camera adapted to produce from a single exposure of a subject a plurality of photographs thereof.

Diffusion transfer process cameras are characterized by their ability to provide a positive photograph shortly after exposure. At present diffusion transfer process film will yield after exposure a positive print within ten seconds. An example of diffusion transfer process film is the "Series 40" film manufactured by the Polaroid Corporation, Cambridge, Massachusetts.

The invention is of special use as an identification camera for security programs, law enforcement records, or other situations where a number of photographs of a person are needed with least delay. Usually, a photograph is taken on a film or glass, developed to a negative and then the required number of photographs are printed on a photographic paper from the original negative. If the original photograph is blurred or incorrectly exposed, retakes are necessary with a consequent loss of time and material. These disadvantages are overcome by cameras using instantly processable materials such as diffusion transfer process film.

Heretofore, multiple image cameras using diffusion transfer process film were devised in various forms. One form, coupled together a number of individual cameras, each with its own camera system. Another, shifted laterally a number of camera systems in a single camera body. This latter form also utilized a mirror arrangement so as to reflect a divided image onto photographic film.

Other multiple image cameras combined a multiplicity of lenses only one of which had its optical axis on the camera axis. The remaining lenses each had to be aligned individually with its optical center connecting the center of the image format on the film and the center of the object. Another example arranged in front of the camera lens but outside the camera itself a set of lenses of sufficient refractive power to turn the light from the subject such that each part produces an image on the film.

It is, therefore, the object of this invention to provide an improved diffusion transfer process camera that simultaneously produces a plurality of similar photographic images of a single subject.

It is a further object of this invention to provide an improved diffustion transfer process camera that simultaneously produces a plurality of separate photographic images upon a single photographic film.

Another object of this invention is to provide an improved diffusion transfer process camera that provides a positive print directly after the taking thereof.

A further object of this invention is to provide an improved diffusion transfer process camera that includes all the camera elements in a unitary housing.

An object of this invention is to provide an improved diffusion transfer process camera that is simple to operate.

Another object of this invention is to provide an improved diffusion transfer process camera that has a single diaphragm control for a plurality of lenses.

An object of this invention is to provide an improved diffusion transfer process camera that is light weight and compact.

A further object of this invention is to provide an improved diffusion transfer process camera that produces a plurality of adjacent images for maximum film utilization.

These and other disadvantages are solved in my invention by disposing a plurality of camera lens system symmetrically about the camera axis and within the shutter aperture.

In accordance with the invention, a diffusion transfer process camera is adapted to produce from a single exposure of a subject a plurality of photographs thereof. The camera includes a plurality of lens system symmetrically disposed about the camera axis for forming a plurality of images of the subject on film simultaneously. Each lens system includes a first element for directing incident light and a second element for focusing the light on the film.

For a better understanding of the present invention, reference is made to the following description taken in connection with accompanying drawings and the scope will be pointed out in the appended claims.

In the drawings:

FIGURE 1 is an exploded perspective view of a camera embodying the invention;

FIGURE 2 is a sectional view of lens assembly of the camera in FIGURE 1; and

FIGURE 3 is a schematic drawing illustrating the principles of operation of the camera lens system.

Referring now to FIGURE 1, there is here illustrated a diffusion transfer process camera embodying the present invention. The camera is adapted to produce from a single exposure of a subject a plurality of photographs thereof. The camera illustrated in FIGURE 1, produces four similar photographs of a single subject on a film 10. The camera includes a camera housing 12 which defines a camera axis 14. The film 10 is of the diffusion transfer reversal type and the camera film housing 12 is known and described in the art, for example, in United States Patent Number 2,435,717, filed in the name of E. H. Land on October 6, 1945. The camera film housing 12 is provided with a removable back cover 16 for supporting the film 10 perpendicular to the camera axis 14. The back cover 16 provides easy access for inserting and removing the film 14. Coupled to the camera housing film 12 are alignment means for centering the subject on the camera axis 14. The optical view finder 18 affixed to the camera film housing 12 provides the alignment means and is preset such that the optical axis of the view finder 18 intercepts the camera axis 14 at a predetermined focal point. That is, the distance along the camera axis 14 from the center of the film 10 and the subject is fixed.

Coupled to the camera housing is a baffle means to shield the light from portions of the film bordering the images. A light tight camera body 20 is affixed to the camera housing 12 at the rear portion thereof to prevent extraneous light from prematurely exposing the film 10. Mounted to the forward portion of the camera body 20 is a mounting plate 22 having a circular aperture 24 therein concentric with the camera axis 14. For quadruple image production the interior of the camera body 20 is fitted with three baffle plates 26 and 28A and 28B, respectively, such that two baffle plates 28A and 28B, respectively, are perpendicular to the third baffle plate 26 along a line coincident with the camera axis 14. The three baffle plates separate the interior of the camera body 20 into four image tunnels. They extend beyond the open rearward portion of the camera body 20 and are adjacent, but do not touch, the film 10. The distance between edges of the three baffle plates and the film 10 is such that the shadow of the three baffle plates on the film 10 when exposed is minimized to provide a neat margin 32 to separate the exposed images. The three baffle plates also serve to divide the image surface of the film 10 into quadruple image formats 34. The image format centers 36 are equidistant from the camera axis 14. It should be noted that each image tunnel 30 is associated with one of the image formats 34.

Coupled to the camera body 20 is a camera shutter 38 for exposing the film 10. The shutter 38 is symmetric about the camera axis 14 and includes a circular shutter frame 40, shutter leaves 42, and shutter actuating lever 44.

The camera includes a plurality of lens systems 46 symmetrically disposed about the camera axis 14 for forming a plurality of images of the subject on the film 10 simultaneously. The lens systems are symmetrically disposed about the camera axis 14 and are partially disposed within the shutter frame 40, by mounting in the lens board 46 which is in turn fixed to the shutter frame 40. For four photographs there are four lens systems and the lens board 46 is provided with four circular apertures 48 for receiving the individual lens systems. The apertures 48 are so disposed that their centers are equidistant from the camera axis 14.

The elements of the lens system, will be described, with reference to FIGURES 1 and 2. The lens elements 72 and 74 are suitably mounted within lens barrels 50 each of which has an axis 52 parallel to the camera axis 14 and is incident with the center of its respective aperture 48 in the lens board 46. The lens barrels 50 are fixed within the apertures 48 in the lens board 46 by any suitable means. The forward end of each lens barrel 50, that is, the end nearest the subject is provided with an iris diaphragm, not shown, which is rotatably mounted in the lens barrels 50 to vary the lens aperture. Each iris diaphragm assembly 54 is provided with a gear 56 that is meshed with a sun gear 58 rotatably mounted on the lens board 46, so that rotation of one iris diaphragm 54 rotates the other three to uniformly regulate the amount of light entering the individual lens systems.

As previously described the prior devices provided multiple photographs but the devices themselves were bulky and unwieldy. Furthermore, the operator was required to manually preset and focus each lens and/or mirror to a particular position for achieving optimum results. To overcome these limitations, I found that using a shutter having a small diameter would reduce the size, weight, and cost while substantially reducing parallax to provide satisfactory photographs. However, a small diameter shutter imposes a space limitation for fitting the lens system into the shutter aperture.

For the moment and disregarding the changes necessary to accommodate the change in disposition of the camera lenses concentrically about the camera axis due to space limitations, the camera lens would be disposed normally with its optical center 60 in the lens plane 62, as shown in FIGURE 3. Parallel to the camera axis 14 is the optical axis 64 intersecting the central light ray 66 joining the center of the subject and the image format center 36. However, where space requires the optical axis 64 to be shifted towards the camera axis 14 to a shifted optical axis 68, there is a proportional shift of the central light ray 66 from the image format center 36 with consequent shift of the image on the film format 34. That is, the central light ray 66 shifts from the image format center 36 to an incident point 70 on the image format 34 along a shifted central light ray 78. Also, a shifted optical center 76 is established in the lens plane 62.

To direct the central ray 66 back to the image format center 36, I have included with the lens system a first element directing incident light and a second element for focusing the light on the film 10.

As shown in FIGURES 1 and 2, the first element is a prism that may take various surface configurations as is well known in the optics art, e.g., a planar or spherical prism or a combination thereof. I found that an off center section of a negative meniscus lens 72 provides the advantage of correcting for parallax and deriving an added advantage of modifying the focal length of the lens system. The meniscus lens 72 is disposed in the lens barrel 50 between the subject and the shutter 38. The second element for focusing the light on the film 10 is a compound positive lens 74 mounted in the lens barrel 50 between the first element and the shutter 38. The second element is disposed in the lens barrel 50 with its optical axis 68 (FIGURE 3) coinciding with the barrel axis 52.

Because the diverging meniscus lens 72 is disposed off its optical axis, the distance between the optical axis 68 of the converging lens 74 and the optical axis 80 of the meniscus lens 72 can be calculated from an evaluation of the deviation angle. The deviation angle is an angular measurement of the rotation required to restore the shifted central light ray 78 from the point 70 to the image format center 36 with the center of rotation at the shifted optical center 76. That is, the shifted central light ray 78 must be diverted at the shifted optical center 76 along a new path 82 to the image format center 36. The product of the tangent of the deviation angle and the focal length of the meniscus lens 72 is the required axis distance 84. Because the distance may place the optical axis 80 outside the lens barrel 50, only that portion of the meniscus lens 72 required to gather sufficient light is included in the lens barrel 50. That is, the meniscus lens 72 is essentially a spherical prism.

While I do not intend to be limited to any particular shape or sizes of parts in the embodiment of the invention just described, there follows a set of sizes and dimensions for the more important elements which have been found to be particularly suitable for a diffusion transfer process camera of the type represented by FIGURES 1 and 2. In operation, a diffusion transfer process camera embodying the present invention can use a regular eight exposure roll of standard Polaroid Land "Series 40" film and may be used in a fixed location or hand held, with or without auxiliary lighting. The camera itself weighs only six pounds and measures ten inches high, six inches wide and six and one half inches deep. The camera is prefocused for a fixed lens to subject distance. For the first element, a circular section of a negative lens meniscus 72 of five hundred millimeters focal length and for the second element, a positive lens 74 of ninety millimeters focal length provide individual portraits off center at a one tenth reduction. The permanent, ready to use multiple photograph is available in ten seconds. The operator need only to locate the subject through the view finder 18, set the iris diaphragm assembly 54 for light and trip the shutter 38. In ten seconds, the photographs are available for inspection and if they are imperfect, the operator makes the necessary corrections and retakes. Again, in ten seconds, the permanent, ready to use photographs are ready for distribution.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:
1. A camera for producing from a single exposure of a subject a plurality of images having centers substantially symmetrically disposed about a camera axis in an image receiving plane, comprising:
   a light tight housing;
   means for transporting and storing an image receiving material within said housing;
   a plurality of lenses coupled to said housing and symmetrically disposed about said camera axis, said lenses each having optical centers so disposed relative to said image centers whereby lines passing through said optical centers and image centers converge between said lenses and said subject; and a prism associated with each of said lenses for diverging said converging lines to cause intersection thereof substantially at said subject whereby a plurality of geometrically like images of said subject are provided in said image receiving plane.

2. The combination of claim 1 wherein said prisms are planar.

3. The combination of claim 1 wherein said prisms are spherical.

4. The combination of claim 1 wherein said prisms are compound planar-spherical.

5. A camera for producing from a single exposure of a subject a plurality of images having centers substantially symmetrically disposed about a camera axis in an image receiving plane, comprising:
   a light tight housing;
   means for transporting and storing an image receiving material within said housing;
   a plurality of lenses coupled to said housing and symmetrically disposed about said camera axis, said lenses each having optical centers so disposed relative to said image centers whereby lines passing through said optical centers and image centers converge between said lenses and subject;
   a prism associated with each of said lenses for diverging said converging lines to cause intersection thereof substantially at said subject whereby a plurality geometrically of like images of said subject are provided in said image receiving plane; and
   a unitary shutter means coupled to said housing and disposed between said lenses and image receiving plane for synchronously allowing imaging light to enter said plurality of lenses upon actuation thereof.

6. The combination of claim 5 wherein said image receiving storage and transporting means further includes means for processing positive photographs of said images.

7. The combination of claim 6 wherein said processing means is for diffusion transfer processing.

8. A camera for producing from a single exposure of a subject a plurality of images having centers substantially symmetrically disposed about a camera axis in an image receiving plane, comprising:
   a light tight housing;
   means for transporting and storing an image receiving material within said housing;
   a plurality of lenses coupled to said housing and symmetrically disposed about said camera axis, said camera axis, said lenses each having optical centers so disposed relative to said image centers whereby lines passing through said optical centers and image centers converge between said lenses and subject;
   a prism associated with each of said lenses for diverging said converging lines to cause intersection thereof substantially at said subject whereby a plurality of geometrically like images of said subject are provided in said image receiving plane; and
   baffle means coupling said lenses and prisms to said image receiving plane for shielding portions of image receiving material bordering said images.

9. A camera for producing from a single exposure of ı subject a plurality of images having centers substantially ymmetrically disposed about a camera axis in an image eceiving plane, comprising:
   a light tight housing;
   means for transporting and storing an image receiving material within said housing;
   a plurality of lenses coupled to said housing and symmetrically disposed about said camera axis, said lenses each having optical centers so disposed relative to said image centers whereby lines passing through said optical centers and image centers converge between said lenses and subject;
   a prism associated with each of said lenses for diverging said converging lines to cause intersection thereof substantially at said subject whereby a plurality of geometrically like images of said subject are provided in said image receiving plane;
   a variable aperture iris diaphragm coupled to each of said lenses for varying the amount of light passing therethrough; and
   coupling means for movably interconnecting each of said diaphragms whereby varying the aperture of one diaphragm causes a like variation in each of the other apertures.

10. A camera for producing from a single exposure of a subject a plurality of images having centers substantially symmetrically disposed about a camera axis in an image receiving plane, comprising:
   a light tight housing;
   means for transporting and storing an image receiving material within said housing;
   a plurality of lenses coupled to said housing and symmetrically disposed about said camera axis, said lenses each having optical centers so disposed relative to said image centers whereby lines passing through said optical centers and image centers converge between said lenses and subject;
   a prism associated with each of said lenses for diverging said converging lines to cause intersection thereof substantially at said subject whereby a plurality of geometrically like images of said subject are provided in said image receiving plane;
   alignment means for centering said subject on said camera axis at a fixed camera focal distance.

11. A camera for producing from a single exposure of a subject a plurality of images having centers substantially symmetrically disposed about a camera axis in an image receiving plane, comprising:
   a light tight housing;
   means for transporting and storing an image receiving material within said housing including means for diffusion transfer processing of said images;
   a plurality of lenses coupled to said housing and symmetrically disposed about said camera axis, said lenses each having optical centers so disposed relative to said image centers whereby lines passing through said optical centers and image centers converge between said lenses and subject;
   a prism associated with each of said lenses for diverging said converging lines to cause intersection thereof substantially at said subject whereby a plurality of geometrically like images of said subject are provided in said image receiving plane;
   a variable aperture iris diaphragm coupled to each of said lenses for varying the amount of light passing therethrough;
   coupling means for movably interconnecting each of said diaphragms whereby varying the aperture of one diaphragm causes a like variation in each of the other apertures;
   a unitary shutter means coupled to said housing and disposed between said lenses and image receiving plane for synchronously allowing imaging light to enter said plurality of lenses upon actuation thereof;
   baffle means coupling said lenses and prisms to said image receiving plane for shielding portions of image receiving material bordering said images; and
   alignment means for centering said subject on said camera axis at a fixed camera focal distance.

References Cited in the file of this patent

UNITED STATES PATENTS

| | | |
|---|---|---|
| 2,326,951 | Kober | Aug. 17, 1943 |
| 2,505,140 | Peltz | Apr. 25, 1950 |
| 2,730,024 | Merrick | Jan. 10, 1956 |
| 2,737,098 | Millet | Mar. 6, 1956 |
| 2,843,030 | Perlin | July 15, 1958 |
| 2,921,509 | Freund | Jan. 19, 1960 |
| 2,977,844 | Winkler | Apr. 4, 1961 |